United States Patent
Hufnagel et al.

(10) Patent No.: US 9,859,786 B2
(45) Date of Patent: Jan. 2, 2018

(54) RESISTORLESS PRECHARGING

(71) Applicant: DET International Holding Limited, George Town, Grand Cayman (KY)

(72) Inventors: Michael Hufnagel, Arnsberg (DE); Frank Schafmeister, Warburg (DE)

(73) Assignee: DET INTERNATIONAL HOLDING LIMITED, Grand Cayman (KY)

(*) Notice: Subject to any disclaimer, the term of this patent is extended or adjusted under 35 U.S.C. 154(b) by 328 days.

(21) Appl. No.: 14/535,926

(22) Filed: Nov. 7, 2014

(65) Prior Publication Data

US 2015/0131343 A1    May 14, 2015

(30) Foreign Application Priority Data

Nov. 8, 2013  (EP) .................................... 13192249

(51) Int. Cl.
*H02M 1/42* (2007.01)
*H02M 7/12* (2006.01)
(Continued)

(52) U.S. Cl.
CPC ........... *H02M 1/42* (2013.01); *H02M 1/4225* (2013.01); *H02M 7/12* (2013.01); *H02M 1/32* (2013.01);
(Continued)

(58) Field of Classification Search
CPC ........ H02M 1/42; H02M 1/4225; H02M 7/12; H02M 1/32; H02M 1/36; H02M 1/4233; H02M 7/125; Y02B 70/126
See application file for complete search history.

(56) References Cited

U.S. PATENT DOCUMENTS 5,420,780 A * 5/1995 Bernstein ............... H02H 9/001
                                                323/908
6,204,630 B1   3/2001 James
(Continued)

FOREIGN PATENT DOCUMENTS

EP   1 186 093 B1   5/2003
EP   2 456 060 A1   5/2012
(Continued)

OTHER PUBLICATIONS

European Office Action dated Dec. 16, 2015 received in European Application No. 13 192 249.4.
(Continued)

*Primary Examiner* — Jared Furman
*Assistant Examiner* — Rafael Pacheco
(74) *Attorney, Agent, or Firm* — Birch, Stewart, Kolasch & Birch, LLP (57) ABSTRACT

A boost PFC converter includes a rectifier, a converter and an output stage comprising an output capacitor where the DC output voltage is provided across the output capacitor. The rectifier includes four rectifying elements connected in a full bridge configuration where the upper two of these four rectifying elements are thyristors and where the lower two are diodes. In that the thyristors are controlled such as to be open for only a part of each half period of the input voltage, the amount of current per half period that is passed to the output capacitor is controllable and can be made very small. Accordingly, the charge current for precharging the output capacitor can be controllably limited such that a bulky precharge resistor is not required anymore to avoid high inrush currents.

20 Claims, 3 Drawing Sheets

(51) Int. Cl.
H02M 1/32 (2007.01)
H02M 1/36 (2007.01)

(52) U.S. Cl.
CPC ............ *H02M 1/36* (2013.01); *H02M 1/4233* (2013.01); *H02M 7/125* (2013.01); *Y02B 70/126* (2013.01)

(56) References Cited

U.S. PATENT DOCUMENTS

| | | | |
|---|---|---|---|
| 2007/0062744 A1* | 3/2007 | Weidenheimer | F41B 6/00 307/71 |
| 2011/0169448 A1* | 7/2011 | Ichikawa | B60K 6/445 320/109 |
| 2012/0313616 A1 | 12/2012 | Lee et al. | |
| 2013/0038283 A1 | 2/2013 | Acena et al. | |

FOREIGN PATENT DOCUMENTS

| | | | |
|---|---|---|---|
| EP | 2 498 388 A2 | 9/2012 | |
| EP | 2 501 026 A2 | 9/2012 | |
| EP | 2 620 315 A2 | 7/2013 | |

OTHER PUBLICATIONS

Summons to Attend Oral Proceedings Pursuant to Rule 115(1) EPC dated Jun. 22, 2017 received in corresponding EP Application No. 13192249.4.

Brief Communication of Oral Proceedings dated Oct. 19, 2017 received in corresonding EP Application No. 13192249.4.

* cited by examiner

RESISTORLESS PRECHARGING

TECHNICAL FIELD

The invention relates to converter arrangements including an input stage comprising two input terminals for connecting an AC input voltage, a converter stage for converting the AC input voltage to a DC output voltage and an output stage comprising an output capacitance, where the DC output voltage is provided across the output capacitance, the converter arrangement further including a controllable switch arranged in a current path from one of the two input terminals to the other and including said output capacitance and a control unit adapted to control the controllable switch for precharging the output capacitance at a startup of the converter arrangement. The invention further relates to a corresponding method for precharging an output capacitance of a converter arrangement and an automotive vehicle including at least one electric motor, a first energy storage for driving said at least one electric motor and including such a converter arrangement for charging the first energy storage.

BACKGROUND ART

Many electrical devices that are to be operated at a mains power supply network, i.e. in the power range from 300 W (Watt) to several $10^{th}$ of kW (kilowatt), are designed to receive a DC input voltage. The mains supply usually is a single or multiphase AC voltage grid which has therefore to be converted into a DC voltage for supplying such devices. The DC voltage required by an electrical device is usually provided by an AC/DC power supply unit (PSU). Power supply units are available for a wide range of applications, such as for example computers such as servers or personal computers, storage devices and network industry as well as for telecom infrastructure. But they are also available for inductive cooking/heating systems or automotive chargers, particularly on-board chargers (OBCs) used in electrically driven cars and other EV (electric vehicles) or HEV (hybrid electric vehicles). Such OBCs charge the high-voltage traction battery used in such vehicles for providing the electrical power to the motor directly from the public AC power grid.

PFC converters are the front-end stages of many of today's AC/DC PSUs which operate directly from the AC mains. The PFC stage regulates the AC side power factor close to one (power factor correction) and it also controls the DC-link voltage which is the input voltage for the subsequent stages independently of the actual power flow to a constant value. The DC-link voltage is usually provided across a capacitor at the converters output. Most of those PFC stages operate according to the boost principle, i.e. the DC-link voltage in normal operating mode has always to be larger than any instantaneous value of the AC input voltage, which can be assumed to be sinusoidal over time with an amplitude $\hat{U}_{AC}$ and an angular frequency $\omega$.

A standard boost PFC converter includes a full bridge diode rectifier for rectifying the AC input voltage, followed by a boost inductance and a boost diode that is connected to the first output terminal. A controllable switch such as an IGBT, a MOSFET, thyristor or the like is connected between the boost inductance and the second output terminal and the DC-link capacitor is connected between the two output terminals. As already mentioned, the DC-link voltage in normal operating mode has to be larger than the AC input voltage at every single point in time. But before startup of the boost PFC converter the DC-link capacitance is usually discharged which means the voltage across the DC-link capacitor is usually 0 V (Volts). This means that the DC-link capacitance has to be precharged before the converter can be operated in its normal boost mode. In order to avoid high inrush currents, the input voltage may not directly be connected to the output capacitor, because the inductance of the boost inductor is quite small and therefore is not sufficient to limit the charge current sufficiently.

A known solution to precharge the DC-link capacitance of such a boost PFC converter is to provide a resistor R in the charge current path such as to limit the current flowing into the DC-link capacitor. Once the DC-link capacitor is fully charged, the resistor R is bypassed by closing a switch that is connected in parallel to the resistor R. The switch can be implemented as an electromechanical relay or by different types of switchable power semiconductors like e.g. IGBT, MOSFET or thyristor. Different locations for the resistor R are possible, either at the AC side, for example between an input terminal and the rectifier, or at the DC side, for example between the second output terminal and the rectifier. In certain applications a surge diode is also provided bypassing the boost diode and the boost inductance.

In another known solution two additional diodes are provided, each of them being connected in conduction direction from a different one of the input terminals of the converter to the charge current limiting resistor which itself is connected to the output capacitor. Further, two diodes of the rectifier are replaced by thyristors such that by switching OFF the thyristors the input terminals are disconnected from the boost inductance. Accordingly, the input current flows through the additional diodes and the resistor to the output capacitor. In order to control the thyristors a control unit is provided which is connected to the output capacitor such as to supply the control unit with the electrical energy to provide the control signals for the thyristors. Accordingly, since the output capacitor is not charged at the startup of the converter, the control unit is not powered up and therefore the thyristors are switched OFF. As soon as the output capacitor is charged to a certain level, the control unit is powered up. Then it is able to switch the thyristors ON such as to bypass the additional diodes and the resistor thereby stopping the precharging of the output capacitor and starting the normal boost operation of the converter.

Document EP 1 186 093 B1 (Ascom Energy Systems AG) discloses another solution for precharging the output capacitor. One of the rectifier diodes is replaced by a thyristor 18 and a precharge path 2 including a diode 20 and a resistor 19 is provided in parallel to that thyristor 18. At the startup, the thyristor is switched OFF such that the current flows through the precharge path 2 to the output capacitor. A control circuit including a voltage divider 25, a reference voltage 26, a limiting diode 27 and a comparator 28 provides the control signals for controlling the thyristor 18.

A main drawback of the prior art is that a resistor is needed to limit the charge current during the charging of the output capacitor. During the precharge interval large currents flow through this resistor and therefore a lot of power has to be dissipated into heat by it. For thermal reasons this resistor has to have a rather bulky volume which also results in certain constraints with regard to the component layout of the power supply and the thermal connection of the resistor. Another drawback is the fact that, apart from the resistor itself, additional components are needed such as for example diodes, a controllable switch or even a rather complex control circuit, which not only results in increased space requirements but also increased manufacturing costs.

SUMMARY OF THE INVENTION

It is the object of the invention to provide a converter arrangement pertaining to the technical field initially mentioned, that enables a simpler design by reducing the design constraints. It is further object of the invention to provide such a converter arrangement with reduced space requirements and decreased manufacturing costs. It is another object of the invention to provide an automotive vehicle including such a converter arrangement and it is still another object of the invention to provide a method for providing such a converter arrangement.

The solution of the invention is specified by the features of claim 1. A converter arrangement according to the invention includes an input stage comprising two input terminals for connecting an AC input voltage, a converter stage for converting the AC input voltage to a DC output voltage and an output stage comprising an output capacitance, where the DC output voltage is provided across the output capacitance. The converter arrangement further includes a controllable switch arranged in a current path from one of the two input terminals to the other where the current path includes the output capacitance. Moreover the converter arrangement includes a control unit adapted to control the controllable switch for precharging the output capacitance at a startup of the converter arrangement. According to the invention, the control unit is adapted to control the controllable switch during startup such that a duty cycle of the controllable switch during at least one half period of the input voltage is between 0 and 1. It is to note that in many applications not only one but two (or even more) such controllable switches are required as outlined below.

By properly controlling the controllable switch such that the switch is open for only a part of a half period of the input voltage, the amount of current per half period of the input voltage passing through the controllable switch can be easily adjusted. Accordingly, just small and controllable segments of a half period of the rectified AC voltage are effectively passed through to the DC-link capacitor resulting in only small, i.e. limited charge currents. For this reason a precharge resistor for the current limitation is no longer required. Since the bulky precharge resistor can be omitted, the design constraints can be significantly decreased. Additionally, by omitting the precharge resistor, the number of components as well as the manufacturing costs can be decreased. Furthermore, not only the precharge resistor can be omitted but also the number of additional components such as the diodes, the controllable switch or even a complex control circuit can be reduced.

Contrary to the prior art where the controllable switches are either switched ON or OFF for the whole precharging time, i.e. until the output voltage across the output capacitor has reached its final level, the controllable switch in a converter arrangement according to the invention is switched ON and OFF in each half period of the input voltage during the precharge interval.

If the controllable switch is for example controlled to be open from 0° to 175° and closed from 175° to 180° in a particular half period during the precharge interval of the input voltage, the duty cycle of the switch is for example $5/180 \approx 0.03$. In the subsequent half period of the input voltage the switch is for example controlled to be open from 0° to 170° and closed from 170° to 180°, resulting in a ratio of about $10/180 \approx 0.06$.

The same duty cycle of $5/180 \approx 0.03$ can however also be realised by controlling the switch such as to be closed from 0° to 5° and open from 5° to 180°, or by controlling it such as to be closed from 155° to 160° and open from 0° to 155° as well as from 160° to 180°.

The amount of power passing through the controllable switch however not only depends on the duty cycle of the switch but also on the exact angle of the half period when the switch is closed and opened again. Given a more or less sinusoidal waveform of the input voltage the power transferred through the switch during the interval of 0° to 5° is much lower than the power transferred through the switch during the interval of 45° to 50°, because the voltage during the second interval is much higher than that of the first interval.

Accordingly, in order to charge the output capacitor with small charge currents, the controllable switch may in a preferred embodiment of the invention be controlled by increasing the duty cycle during several half periods. In another embodiment the charge currents can be controlled by keeping the duty cycle generally constant and varying the angle within the half periods when the switch is switched ON. Since this would require a forced switching OFF of the switch independent of the voltage across it, this can only be realised with certain switches such as for example MOSFETs or IGBTs. It is self-evident that both control mechanisms can be combined.

In fact, the duty cycle is between 0 and 1 during most of the half periods of the input voltage during the precharge interval. Only at the beginning or the end of the precharge interval the duty cycle may be chosen to be practically 0 or 1 respectively.

As already mentioned above, the invention eliminates the need for a precharge resistor. Nevertheless, a resistor could be arranged in the current path to the output capacitor anyway. However, such a resistor would again increase the design constraints, the space requirements as well as the costs and, if it is not bypassed during normal converter operation, would heavily increase the conduction losses of the converter and therefore decrease its efficiency. In a preferred embodiment of the invention, the current path including the output capacitance is generally resistorless. In the context of this description, the term generally resistorless has to be understood such that the current path does not include any resistors, i.e. any explicit resistor components. It is however not to be understood such that this current path is totally resistance-free, because the current path will most probably include parasitic resistances being caused by other components of the converter.

As mentioned above, the converter arrangement according to the invention is particularly applicable in PFC converters, and particularly in PFC boost converters, both of which are therefore preferred embodiments of the invention. The invention may however also be applied in other types of converters where a charge current of a capacitor has to be limited during a precharge interval. Such converters are for example other boost converters.

Since the controllable switch has to be controlled right from the beginning of the precharge interval, it is not possible to use the output capacitor as a power source for the control unit. It would however be possible to derive a supply voltage directly from the input voltage such as for example by means of a voltage divider or any other suitable means. However, this would require again providing additional components to the converter which is not desirable.

The converter arrangement therefore preferably includes an auxiliary power supply for providing power to the control unit at least during the startup of the converter arrangement.

Such an auxiliary power supply may for example be a battery or the like that is integrated into the converter.

But in certain applications such as for example in an EV/HEV, an additional power sources is available anyway. Additionally to the high-voltage traction battery such EVs usually include a low-voltage battery (often 12 V), for supplying electrical energy to on-board systems such as lighting, ignition, displays, air conditioning and the like—much the same as is conventionally done in non-electric vehicles.

For applications where such a low voltage battery is available, the converter arrangement according to the invention preferably includes an auxiliary power input for connecting the external power source. Hence, the auxiliary power supply of the converter arrangement is connected to the auxiliary power input. Although it would generally be possible that a high-voltage power source (which in the case of EV/HEV applications is different from the high voltage traction battery for driving the EV/HEV) is connected to the auxiliary power input, it is advantageous that the auxiliary power input is configured to receive DC power from a low-voltage battery, particularly a low-voltage battery of an automotive vehicle. If a high-voltage power source is connected to the converter arrangement, the voltage received would again have to be transformed to a low-voltage in order to supply energy to the control unit.

The auxiliary power supply may be used to feed the control unit all the time. But in order to preserve this auxiliary power supply, the converter arrangement is adapted to provide power to the control unit after the startup of the converter arrangement. For example, the output capacitor can be used as a power supply to feed the control unit once the precharge interval has ended and the output capacitor is fully charged.

The controllable switch may for example be realised by an electromechanical device such as a relay. But depending on the specific application electromechanical devices are more prone to mechanical vibrations as for example power semiconductors. But mechanical vibrations are an issue for example in an automotive application, wherefore power semiconductors such as IGBT, MOSFET or thyristor, are preferably used as controllable switches.

In a most preferred embodiment of the invention, the controllable switch however includes a thyristor. Thyristors can also be regarded as controllable diodes in the sense that they controllably enable current flow in one direction but block current flow in the other direction. This characteristic often can be combined with other functions of the converter arrangement. Moreover, a common control method for thyristors is phase angle control, where a thyristor connected to an AC input voltage is switched ON at a specific angle and stays ON as long as it is forward biased (that is, while the voltage across the device is not reversed). Accordingly, when using a thyristor as the controllable switch, the control unit is preferably adapted to control the controllable switch by phase angle control.

Phase angle control may be applied in different ways. The thyristor may for example be controlled such as to switch ON when a zero-crossing of the voltage across the thyristor occurs and to switch it OFF at a specific angle prior to the next zero-crossing. However, the circuit complexity to properly control the switches is higher in this case and specific thyristor such as GTOs have to be used. It is therefore preferred that the thyristor is controlled such that it is switched ON at a specific angle after a zero-crossing of the input voltage. It then automatically switches OFF at the next zero crossing. In a preferred embodiment, the control unit is therefore adapted to switch the thyristor ON at a predetermined ignition phase angle, where the ignition phase angle at a beginning of the startup of the converter is chosen to be between 165° and 180° and where the ignition phase angle is decreased from half period to half period of the input voltage by an angle of $\Delta\alpha$, where $\Delta\alpha$ is between 0° and 15°, preferably between 0.1° and 5° and most preferably between 0.3° and 2°. Preferably, the ignition phase angle in the first half period of the precharge interval is chosen to be 180°−$\Delta\alpha$.

In this example, the angle $\Delta\alpha$ is chosen to be constant. However, in another preferred embodiment of the invention, the control unit is adapted to vary $\Delta\alpha$ from half period to half period. The angle $\Delta\alpha$ can generally be varied randomly within the above mentioned boundaries or it can be varied by decreasing it from half period to half period. But it is advantageous to increase the angle $\Delta\alpha$ from half period to half period. In this way, the current peaks can be kept more or less constant whereas the current peaks in the case of a constant angle $\Delta\alpha$ decrease due to the sinusoidal character of the input voltage. As a consequence, the precharging interval will be smaller when the angle $\Delta\alpha$ is increased.

In a normal operation mode, i.e. after the startup when the DC output voltage has reached its final level (which generally equals the value of the amplitude of the AC input voltage) or when the converter has reached a steady state of operation, the thyristors are preferably controlled by applying a slightly negative ignition phase angle. For example, the control unit is adapted to set the ignition phase angle to a value between −25° to 0°, particularly to a value between −10° to 0°. This means that the thyristor is switched ON slightly before the zero-crossing of the input phase to avoid any delay in the ignition pulse and to guarantee that the thyristor gets conductive as soon as a positive voltage lies across its anode-cathode terminals. If during normal operation the thyristor is switched ON slightly after the zero crossing, the efficiency decreases. Furthermore, since the AC current drawn from the power source will not be sinusoidal in this case, the Total Harmonic Distortion (THD) and the Power Factor cannot reach satisfying levels.

In some embodiments of the invention the controllable switch is provided as a separate component additionally to the components of the converter arrangement and it can be positioned anywhere in the charge current path. It can for example be positioned directly at the input of the converter, between the rectifier and the converter or even in the output stage. But in order to even more decrease the number of components the controllable switch is used not only for the single task of output capacitor precharging but also for at least one additional task.

As previously mentioned, a thyristor can be regarded as a controlled diode. It is therefore advantageous to use the thyristor not only for the precharging during startup but also as a diode of the converter. The converter stage usually includes a rectifier that is connected to the input of the converter arrangement and it also includes a DC to DC converter that is connected to an output of the rectifier and that provides said DC output voltage. The input of the converter stage may not only be a straight DC voltage, but also a pulsating DC or—as in our examples—a rectified AC voltage. In a preferred embodiment of the invention, the rectifier includes at least two rectifying elements, where at least one of the rectifying elements includes said controllable switch. Particularly, at least one of the rectifying elements in each current path of the rectifier is replaced by a controllable switch. Accordingly, the controllable switch additionally performs the rectifying task.

Rectifiers can be realised in many different ways. Often, half-bridge rectifiers are used where the negative half wave of the input signal is just blocked. In order to provide more power to the device that is fed by such converters, the rectifier is usually realised as a full bridge diode rectifier where also the negative half period of the input voltage is rectified and passed on to the converter stage. In a preferred embodiment of the invention, the rectifier therefore includes four rectifying elements configured in a full-bridge configuration where two of said rectifying elements include a controllable switch.

The solution of the invention regarding the provision of an automotive vehicle is specified by the features of claim 12. Automotive electric or hybrid electric vehicles (EV/HEV) such as electrically driven cars or the like are a preferred application of the invention because the battery for driving the electric motor of such vehicles is usually charged at the mains public network. According to the invention, such an automotive vehicle includes a first energy storage for driving said at least one electric motor as well as a converter arrangement as described above in the form of an on-board charger for receiving AC power from an external AC power source and for charging the first energy storage of the automotive vehicle. The energy storage for driving the electric motor is preferably a high voltage traction battery.

In a preferred embodiment of the automotive vehicle according to the invention, it further includes a second energy storage for providing low-voltage DC power to a subsystem of the automotive vehicle other than the motor. Such a subsystem may for example be an on-board system such as lighting, ignition, displays, air conditioning and the like. The on-board charger includes an auxiliary power input to which the second energy storage is connected for providing power to the control unit of the on-board charger at least during the startup of the on-board charger.

The solution of the invention regarding the provision of a method for providing a converter arrangement as described above is specified by the features of claim 14.

The method for providing a converter arrangement for converting an AC input voltage to a DC output voltage includes the following steps:
- a step of providing an input stage comprising two input terminals for connecting an AC input voltage, a converter stage for converting said AC input voltage to said DC output voltage and an output stage comprising an output capacitance,
- a step of connecting said converter stage to said output stage for providing the DC output voltage across the output capacitance,
- a step of arranging a controllable switch in a current path from one of the two input terminals to the other and including said output capacitance and
- a step of providing a control unit adapted to control the controllable switch for precharging the output capacitance at a startup of the converter arrangement.

According to the invention, the method further includes the step of
- adapting the control unit to control the controllable switch during startup such that a duty cycle of the controllable switch during at least one half period of the input voltage is between 0 and 1.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

Figure 1:
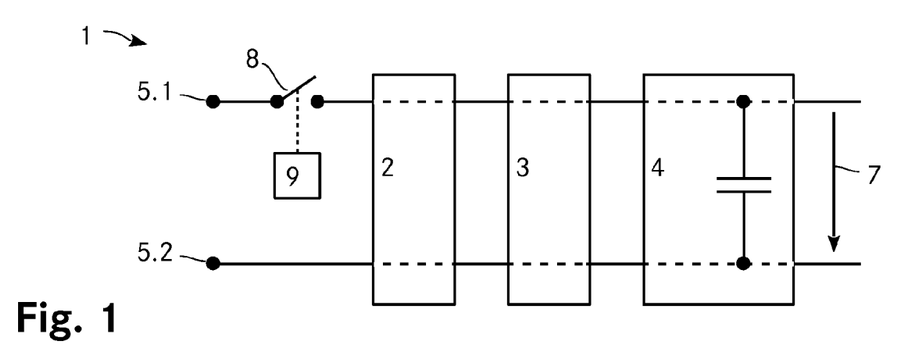
FIG. 1 a schematic depiction of a converter arrangement according to the invention.

FIG. 1 shows a schematic depiction of a converter arrangement 1 according to the invention. The converter arrangement 1 includes two input terminals 5.1, 5.2 for connecting an AC input voltage, an input stage 2, a converter stage 3 and an output stage 4 that includes an output capacitor 6. A DC output voltage 7 is provided across the output capacitor 6.

The converter arrangement 1 further includes a controllable switch 8 that is controlled by a control unit 9. By properly controlling the controllable switch 8 during startup, i.e. by switching it ON during each half period for a certain amount of time, the charge current flowing through the output capacitor 6 can be controlled to be rather small such that the inrush current is limited to a level that does not damage the converter arrangement 1.

Figure 2:
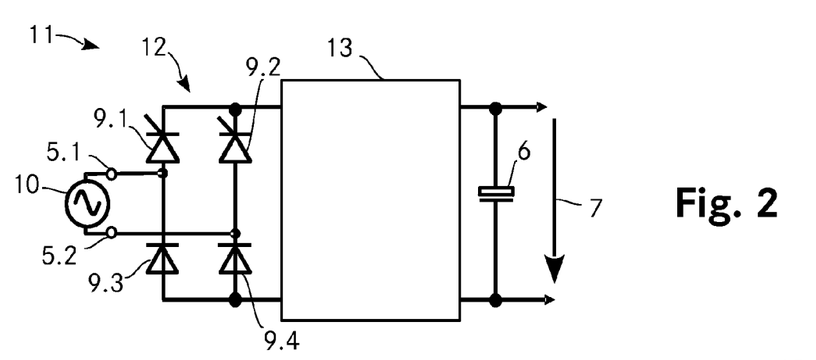
FIG. 2 a schematic depiction of another converter arrangement according to the invention.

FIG. 2 shows another embodiment of the invention. The converter arrangement 11 includes a full-bridge rectifier 12 connected to the input terminals 5.1, 5.2 where a voltage source 10 provides an AC input voltage to the input terminals 5.1, 5.2. The rectifier 12 is followed by a converter stage 13 that provides the output voltage across an output capacitor 6. The rectifier 12 includes four rectifying elements connected in a full-bridge configuration. Each bridge leg of the rectifier 12 includes a thyristor 9.1 or 9.2 respectively in series with a diode 9.3 or 9.4 respectively. FIG. 2 for example depicts a general case of a boost PFC topology. Depending on the specific application, the converter stage 13 includes a certain number of inductances and power switches to provide conversion of the rectified AC input voltage to the DC output voltage 7. The converter stage may for example include some parallel power rails and/or some power transistors. Again, the principle of properly controlling the thyristors 9.1, 9.2 such as to limit the charge current stays the same.

Figure 3:
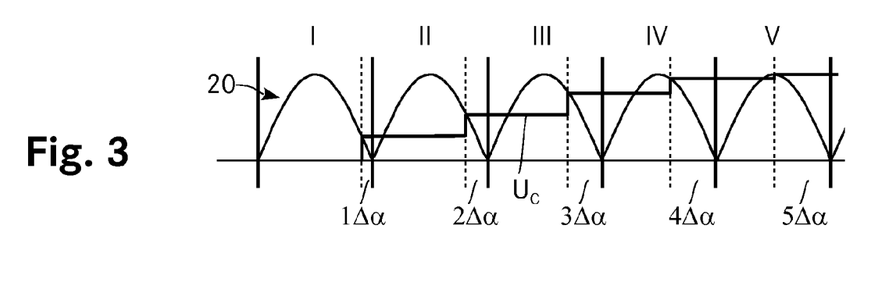
FIG. 3 some half periods of the input voltage with a schematic of the phase angle control of the controllable switches.

FIG. 3 shows an exemplary implementation of the phase angle control of the thyristors 9.1, 9.2 of the converter arrangement 11 to precharge the output capacitor 6. FIG. 3 shows five half periods of the input voltage 20. The first I, the third III and the fifth V half periods of the input voltage 20 show control of switch 9.1 and the second II and the fourth IV half periods show control of switch 9.2.

In order to reduce leakage losses a thyristor should not receive any ignition pulses while a negative voltage is present across its anode-cathode terminals. So, thyristor 9.2 will not receive any ignition pulses in the first I, the third III and the fifth V half period (or generally the positive half periods of the input voltage 20) and thyristor 9.1 will not receive any ignition pulses in the second II and the fourth IV half period (or generally the negative half periods of the input voltage 20).

When starting the precharge process in the first half period I the phase angle of thyristor ignition is just marginally smaller than 180°, i.e. thyristor ignition has to be initiated shortly before the zero-crossing of the input voltage 20. In the example shown ignition occurs at an angle of 180°–$\Delta\alpha$, where $\Delta\alpha$ is the step size. In the following half period (II) the thyristor ignition happens an angle of the step size $\Delta\alpha$ earlier than in the previous half period I, i.e. at an angle of 180°–$2\Delta\alpha$. So the ignition phase angle decreases from one half period to the next by the step size $\Delta\alpha$. In the third half period III the ignition angle is 180°–$3\Delta\alpha$, in the fourth half period IV it is 180°–$4\Delta\alpha$ and in the fifth half period V it is 180°–$5\Delta\alpha$.

FIG. 3 further shows the resulting voltage $U_C$ across the output capacitor 6. Since there is no significant voltage drop between the input terminals 5.1, 5.2 and the unloaded output capacitor 6, voltage $U_C$ increases from half period to half period. In the example shown, the step size $\Delta\alpha$ is chosen to be about 18° such that the ignition phase angle in the fifth half period is exactly 90°. This means that after the fifth half period the voltage $U_C$ corresponds to the amplitude of the input voltage 20 and has therefore reached its maximum.

The resulting AC current peaks which occur with each voltage step of $U_C$ are not shown. They can be limited and controlled by the amount of the step size $\Delta\alpha$ per half period of the ignition angle. In practice the step size $\Delta\alpha$ is chosen to be clearly smaller than shown in this example. The smaller the step size $\Delta\alpha$ the less are the resulting AC current peaks during precharging but the longer takes the precharging process. The value of the step size $\Delta\alpha$ is usually chosen to be somewhere between 0.3° and 3°. A value of the step size $\Delta\alpha$ of about 0.8° has proven to be a good compromise. But as already mentioned above, the step size $\Delta\alpha$ can also be dynamically varied during the precharging process, particularly by increasing it during the precharging process.

There are different possibilities to stop the precharge process or to start the regular operation of the converter arrangement 11. In a first example, the ignition angle is continuously decreased until it reaches 0°. Then, the precharge process will be stopped and normal operation initiated. In this case, the start condition for the regular converter operation is that the ignition angle is 0°. In order to determine the ignition phase angle only the value of the input voltage 20 has to be known to the control unit.

In a second example, the start condition for the regular converter operation is that the voltage $U_C$ across the output capacitor has reached its final level, which means that it has reached the value $\hat{U}_{AC}$ that is the amplitude of the input voltage 20. As soon as this condition is fulfilled, the ignition angle will be set to 0°. In this second example, the regular converter operation will start much sooner than in the first example. In order to determine the ignition phase angle the value of the input voltage 20 has to be known to the control unit as well as the value of the voltage $U_C$.

However, the input voltage 20 as well as the capacitor voltage $U_C$ are needed by the control unit anyway in order to properly control the converter arrangement 11.

When having a full bridge rectifier with four diodes arranged in a bridge configuration, as given for most conventional PFC applications, there are four different options to replace two of the diodes by a thyristor to enable the above described precharging. A first possibility is the one shown in FIG. 2 where both upper diodes are replaced by a thyristor 9.1, 9.2.

Figure 4:
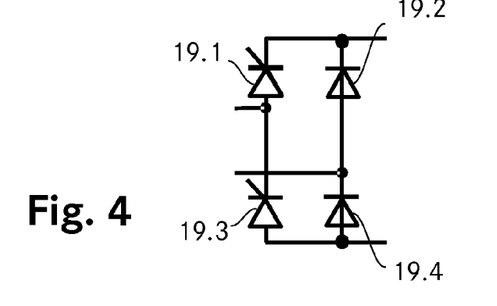
FIG. 4 a schematic depiction of a rectifier stage.

Another possibility is shown in FIG. 4, where the upper left and the lower left diodes are replaced by a thyristors 19.1, 19.3 and where the upper right diode 19.2 and the lower right diode 19.4 remain. This is a bridge-leg wise arrangement of the thyristors. Other possibilities are to just replace the lower left diode and the lower right diode by a thyristor or to just replace the upper right diode and the lower right diode by a thyristor.

The proposed concept works the same way, as long as two thyristors are placed pairwise together, i.e. either both at the high side or both at the low side, or both in the left bridge leg, or both in the right bridge leg. Only a diagonal arrangement would not work.

It is clear that the thyristors generally have to be aligned with same polarity (anode-cathode) as the original diodes they replace. Considering this, the precharge functionality is equivalent for all four arrangement options.

Figure 5:
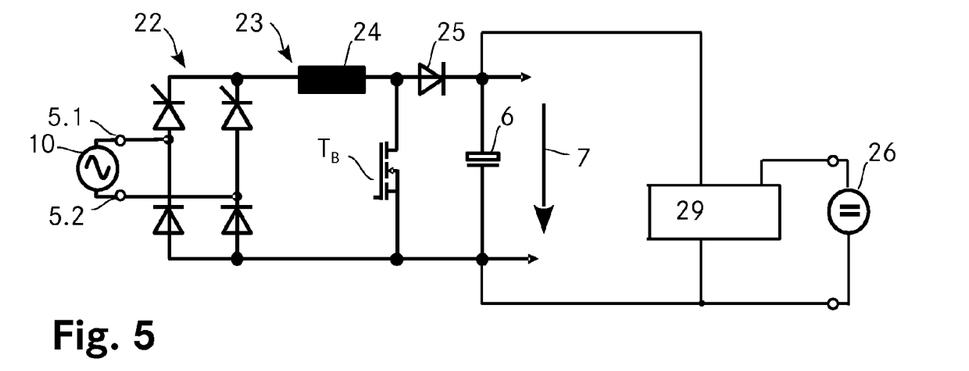
FIG. 5 a schematic depiction of a boost PFC converter according to the invention and including an auxiliary power source.

The most standard form of boost PFC power circuit employing just one power transistor TB is given in FIG. 5. It includes a voltage source 10 connected to the input terminals 5.1, 5.2, a rectifier 22 as described above and a converter stage 23 providing the output voltage 7 across the output capacitor 6. The converter stage 23 in this simple implementation just includes a boost inductance 24 connected to the rectifier 22, and a boost diode 25 connected to the boost inductance 24 and to the upper terminal of the output capacitor 6, as well as the power transistor $T_B$ connected from the common terminal of the boost inductance 24 and the boost diode 25 to the lower terminal of the output capacitor 6.

The control unit 29 generates the control signals for the thyristors of the rectifier and possibly also for the power transistor $T_B$. Since the output voltage 7 is 0 V at the beginning of the precharge interval, the output capacitor 6 cannot be used as a power source for the control unit 29. To be able to generate the thyristor ignition pulses right at the beginning of the precharge interval an auxiliary DC power supply 26 is arranged to supply the control unit 29 with electrical energy. The voltage delivered by the DC power supply 26 should be more or less constant and especially not derived from the output voltage 7. In the application example of automotive OBCs such an auxiliary DC power supply will be present inherently because a low voltage battery having usually 12 V is present in most cases.

Optionally, and as shown in FIG. 5, in addition to the DC power supply 26 the control unit is also connected across the output capacitor 6 as given in the conventional arrangement. The output capacitor 6 can then be used as a power supply for the control unit 29 once the precharge process is finished. The control unit is therefore able to operate from both voltage inputs (which could be at different voltage levels) and is also able to switch over from one to another. When following this approach the energy taken from the DC power supply 26 is very limited. This would allow, for instance to implement the DC power supply 26 as a battery of comparably small capacity.

In the following, some further embodiments of the invention are described with reference to the corresponding drawings. The control principles regarding the thyristors for precharging the output capacitor stay the same as described above for all embodiments and are therefore not repeated here. Also the provision of an auxiliary DC power supply to provide energy to the control unit providing the control signals for the thyristors is identical and not shown.

Further, the general functionality of these examples is very well known in the art and will accordingly also not be described.

Figure 6:
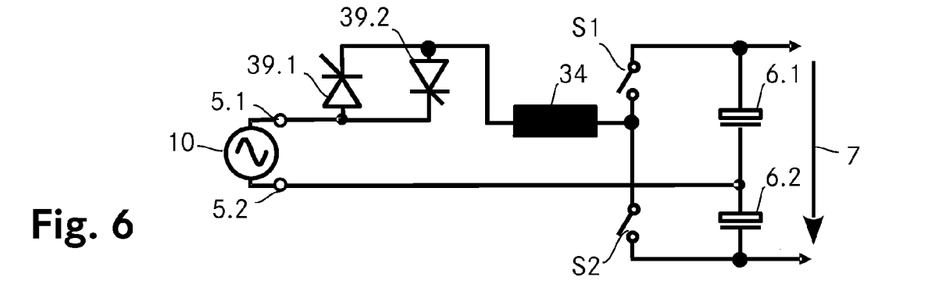
FIG. 6 a schematic depiction of a voltage doubler PFC converter according to the invention.

FIG. 6 shows the application of the invention in a voltage doubler PFC converter. The converter includes a boost inductance 34 connected to the input terminal 5.1. The boost inductance 24 is followed by a series connection of two switches S1, S2 where the boost inductance 24 is further connected to the common terminal of these switches S1, S2. Across the series connection of the two switches S1, S2 a series connection of two output capacitors 6.1, 6.2 is connected where the common terminal of these two output capacitors 6.1, 6.2 is connected to the input terminal 5.2.

The thyristors 39.1, 39.2 for precharging the output capacitors 6.1, 6.2 are connected between the input terminal 5.1 and the boost inductance 34. The thyristors 39.1, 39.2 are connected in an antiparallel fashion such that the anode of each thyristor is connected to the cathode of the other.

In the embodiment shown in FIG. 6 the boost switches S1 and S2 might be implemented in various technologies, which for example include: Si MOSFET (with Si or SiC antiparallel diode), Si IGBT (with Si or SiC antiparallel diode), as SiC MOSFET (with SiC antiparallel diode), or as SiC JFET for example in a cascode configuration with a low voltage Si MOSFET. This also applies for all following embodiments including such switches S1 and S2.

Figure 7:
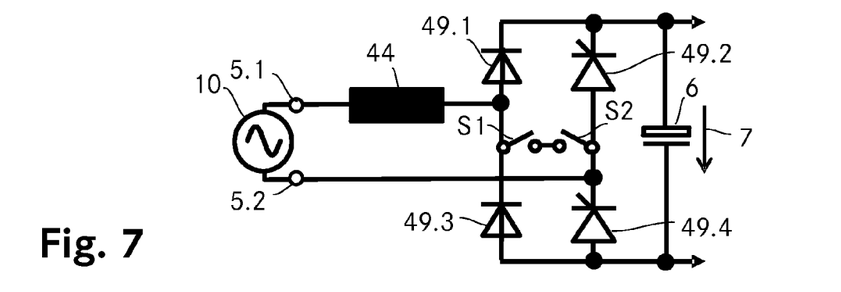
FIG. 7 a schematic depiction of a bridgeless H-PFC converter according to the invention.

FIG. 7 shows the application of the invention in a bridgeless H-PFC converter. The boost inductance 44 is directly connected to the input terminal 5.1 and on the other side to a common terminal of two series connected diodes 49.1, 49.3. In parallel to the series connected diodes 49.1, 49.3 two series connected thyristors 49.2, 49.4 are provided where the common terminal of the thyristors 49.2, 49.4 is connected to the input terminal 5.2. The common terminal of the diodes 49.1, 49.3 and the common terminal of the thyristors 49.2, 49.4 are connected together via two switches S1, S2. The output capacitor 6 is again connected in parallel to the two thyristors 49.2, 49.4. The thyristors 49.2, 49.4 are controlled for precharging the output capacitor 6.

Figure 8:
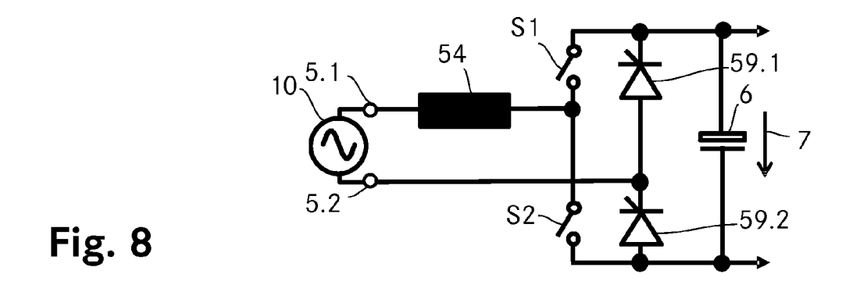
FIG. 8 a schematic depiction of a bridgeless totem-pole PFC converter according to the invention.

FIG. 8 shows a bridgeless totem-pole PFC converter according to the invention. The boost inductance 54 is directly connected to the input terminal 5.1 and on the other side to a common terminal of two series connected Switches S1, S2. In parallel to the series connected switches S1, S2 two series connected thyristors 59.1, 59.2 are provided where the common terminal of the thyristors 59.1, 59.2 is connected to the input terminal 5.2. The output capacitor 6 is connected in parallel to the two thyristors 59.1, 59.2 that are used for precharging the output capacitor 6.

Figure 9:
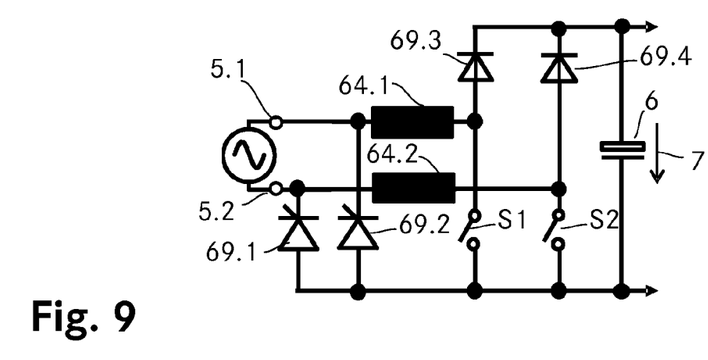
FIG. 9 a schematic depiction of a bridgeless PFC converter with return diodes according to the invention.

FIG. 9 shows a bridgeless PFC converter with return diodes according to the invention. The boost inductance is split into two boost inductances 64.1, 64.2 where each of them is connected to one of the input terminals 5.1, 5.2. The other end of each boost inductance 64.1, 64.2 is connected to an anode of a diode 69.3, 69.4, where the cathodes of these diodes 69.3, 69.4 are connected together to the upper terminal of the output capacitor 6. The anode of both diodes 69.3, 69.4 is connected via a switch S1, S2 to the lower terminal of the output capacitor 6. The lower terminal of the output capacitor is connected via a first thyristors 69.1 to the input terminal 5.2 and via a second thyristors 69.2 to the input terminal 5.1.

Figure 10:
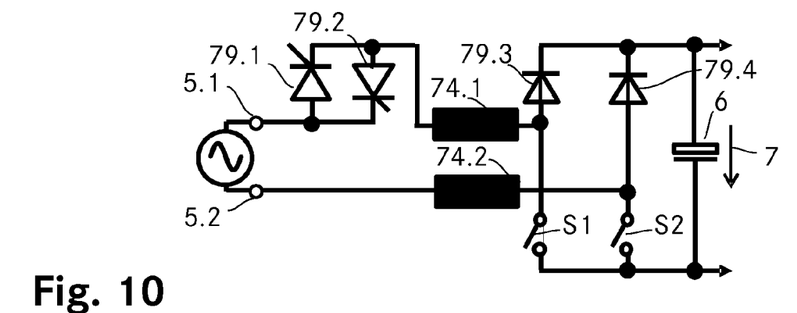
FIG. 10 a schematic depiction of a basic bridgeless PFC converter according to the invention and FIG. 11 a schematic depiction of another embodiment of the invention including an adaptable rectifier stage.

FIG. 10 shows the original (or basic) bridgeless PFC converter according to the invention. Again, as shown the boost inductance is split into two boost inductances 74.1, 74.2 where each of them is connected to one of the input terminals 5.1, 5.2. This topology can however be implemented with a single, i.e. non-split boost inductance. The other end of each boost inductance 74.1, 74.2 is connected to an anode of a diode 79.3, 79.4, where the cathodes of these diodes 69.3, 69.4 are connected together to the upper terminal of the output capacitor 6. The anode of both diodes 79.3, 79.4 is connected via a switch S1, S2 to the lower terminal of the output capacitor 6. Contrary to the example shown in FIG. 9, the two thyristors 79.1, 79.2 used for precharging the output capacitor are provided between the input terminal 5.1 and the boost inductance 74.1. They are connected in an antiparallel fashion such that the anode of each thyristor is connected to the cathode of the other.

Figure 11:
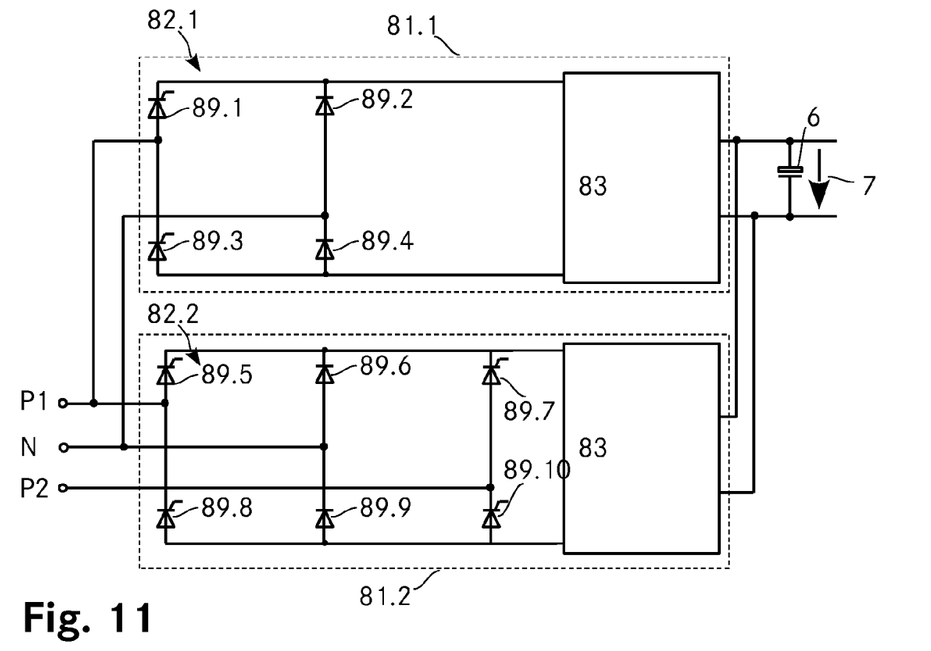

FIG. 11 shows another embodiment of the invention. In this embodiment two converters 81.1, 81.2 are connected in parallel between a multiphase input source and the output capacitor 6. The multiphase input source includes two phase lines P1, P2 and a neutral line N. The converter 81.1 is connected to the neutral line N and the phase line P1 and the converter 81.2 is connected to the neutral line N, the phase line P1 and the phase line P2.

The converter 81.1 includes a rectifier stage 82.1 followed by a converter stage 83 and converter 81.2 includes a rectifier stage 82.2 followed by a converter stage 83. The rectifier stage 82.1 of the converter 81.1 is a full-bridge rectifier where the left bridge leg includes two series connected thyristors 89.1, 89.3 and where the right bridge leg includes two series connected diodes 89.2, 89.4. The thyristors and diodes in this example may however also be swapped. Thyristors 89.1, 89.3 are used to precharge the output capacitor 6.

The rectifier stage 82.2 of the converter 81.2 is a full-bridge rectifier that includes three bridge legs in parallel where the left bridge leg includes two series connected thyristors 89.5, 89.8, where the middle bridge leg includes two series connected diodes 89.6, 89.9 and where the right bridge leg includes two series connected thyristors 89.7, 89.10.

To realise a first function of the thyristors 89.5, 89.8, 89.7, 89.10, they can be controlled to connect the converter 81.2 either between the neutral line N and the phase line P1 (by switching thyristors 89.5 and 89.8 ON and thyristors 89.7 and 89.10 OFF) or to connect the converter 81.2 between the neutral line N and the phase line P2 (by switching thyristors 89.5 and 89.8 OFF and thyristors 89.7 and 89.10 ON).

A second function of the 89.5, 89.8, 89.7, 89.10 is the precharging of the output capacitor 6 as described above. If the converter 81.2 is connected between the neutral line N and the phase line P1, then thyristors 89.5 and 89.8 are used to precharge the output capacitor 6. If the converter 81.2 is however connected between the neutral line N and the phase line P2, thyristors 89.7 and 89.10 are used to precharge the output capacitor 6.

Accordingly, the rectifier 81.2 includes an adaptable rectifier stage. The rectifier stage of converter 81.1 could be implemented in the same way by providing three bridge legs. This would allow to also flexibly connect the converter 81.1 either between the neutral line N and the phase line P1 or the phase line P2.

In summary, it is to be noted that the invention enables the precharging of the output capacitor of a converter arrangement in a simple and efficient way by decreasing the need for additional components and particularly by eliminating the need for a precharge resistor which is usually bulky and results in several design constraints. Further, the invention can be applied in a wide range of converter, particularly PFC converter topologies where an output capacitor is to be precharged prior to the regular converter operation.

The invention claimed is:

1. Converter arrangement including an input stage comprising:
   two input terminals for connecting an AC input voltage,
   a converter stage for converting the AC input voltage to a DC output voltage and
   an output stage comprising an output capacitance, where the DC output voltage is provided across the output capacitance,
   the converter arrangement further including
   a controllable switch arranged in a current path from one of the two input terminals to the other and including said output capacitance and
   a control unit adapted to control the controllable switch for precharging the output capacitance at a startup of the converter arrangement, and
   the control unit is further being adapted to control the controllable switch during startup such that a duty cycle of the controllable switch during at least one half period of the input voltage is between 0 and 1, wherein the converter arrangement includes an auxiliary power supply for providing, power to the control unit at least during the startup of the converter arrangement.

2. Converter arrangement according to claim 1, where said current path is generally resistorless.

3. Converter arrangement according to claim 1 forming a PFC converter, particularly a boost PFC converter.

4. Converter arrangement according to claim 1, including an auxiliary power input for connecting an external power source, where the auxiliary power supply is connected to the auxiliary power input, where the auxiliary power input is preferably configured to receive DC power from a low voltage battery of an automotive vehicle.

5. Converter arrangement according to claim 4, where the converter arrangement is adapted to provide power to the control unit after the startup of the converter arrangement.

6. Converter arrangement according to claim 1, where the converter arrangement is adapted to provide power to the control unit after the startup of the converter arrangement.

7. Converter arrangement according to claim 1, where the controllable switch includes a thyristor and where the control unit is adapted to control the controllable switch by phase angle control.

8. Converter arrangement according to claim 7, where the control unit is adapted to switch the thyristor ON at a predetermined ignition phase angle, where the ignition phase angle at a beginning of the startup of the converter is chosen to be between 165° and 180° and where the ignition phase angle is decreased from half period to half period of the input voltage by an angle of $\Delta\alpha$, where $\Delta\alpha$ is between 0° and 15°, preferably between 0.1° and 5°.

9. Converter arrangement according to claim 8, where the control unit is adapted to vary $\Delta\alpha$ from half period to half period, in particular to increase $\Delta\alpha$ from half period to half period.

10. Converter arrangement according to claim 9, where the control unit is adapted to set the ignition phase angle in a normal operation mode of the converter arrangement to a value between −25° to 0°, particularly to a value between −10° to 0°.

11. Converter arrangement according to claim 8, where the control unit is adapted to set the ignition phase angle in a normal operation mode of the converter arrangement to a value between −25° to 0°, particularly to a value between −10° to 0°.

12. Converter arrangement according to claim 1, where the converter stage includes a rectifier that is connected to the input and a DC to DC converter that is connected to an output of the rectifier and providing said DC output voltage, where the rectifier includes at least two rectifying elements, where at least one of the rectifying elements includes said controllable switch.

13. Converter arrangement according to claim 12 where the rectifier includes four rectifying elements configured in a full-bridge configuration and where two of said rectifying elements include a controllable switch.

14. Automotive vehicle including at least one electric motor, a first energy storage for driving said at least one electric motor, where the automotive vehicle further includes a converter arrangement according to claim 1 for receiving AC power from an external AC power source and for charging the first energy storage of the automotive vehicle, where the energy storage is preferably a high voltage traction energy source.

15. Automotive vehicle according to claim 14, further including a second energy storage for providing low-voltage DC power to a subsystem of the automotive vehicle other than the motor, where the second energy storage is connected to an auxiliary power input of the converter arrangement for providing power to a control unit of the converter arrangement at least during a startup of the converter arrangement.

16. Method for providing a converter arrangement for converting an AC input voltage to a DC output voltage, including the steps of
   providing an input stage comprising two input terminals for connecting an AC input voltage, a converter stage for converting said AC input voltage to said DC output voltage and an output stage comprising an output capacitance,
   connecting said converter stage to said output stage for providing the DC output voltage across the output capacitance,
   arranging a controllable switch in a current path from one of the two input terminals to the other and including said output capacitance and
   providing a control unit adapted to control the controllable switch for precharging the output capacitance at a startup of the converter arrangement, adapting the control unit to control the controllable switch during startup such that a duty cycle of the controllable switch during at least one half period of the input voltage is between 0 and 1,
   further providing power to the control unit at least during the startup of the converter arrangement by an auxiliary power supply included in the converter arrangement.

17. Converter arrangement including an input stage comprising:
   two input terminals for connecting an AC input voltage,
   a converter stage for converting the AC input voltage to a DC output voltage and an output stage comprising an output capacitance, where the DC output voltage is provided across the output capacitance, the converter arrangement further including a controllable switch arranged in a current path from one of the two input terminals to the other and including said output capacitance, and a control unit adapted to control the controllable switch for precharging the output capacitance at a startup of the converter arrangement, the control unit further being adapted to control the controllable switch during startup such that a duty cycle of the controllable switch during at least one half period of the input voltage is between 0 and 1, wherein the converter arrangement includes an auxiliary power supply for providing power to the control unit at least during the startup of the converter arrangement, and wherein the auxiliary power supply is connected to an auxiliary power input for connecting an external power source.

18. Method for providing a converter arrangement for converting an AC input voltage to a DC output voltage, including the steps of:

providing an input stage comprising two input terminals for connecting an AC input voltage, a converter stage for converting said AC input voltage to said DC output voltage and an output stage comprising an output capacitance, connecting said converter stage to said output stage for providing the DC output voltage across the output capacitance, arranging a controllable switch in a current path from one of the two input terminals to the other and including said output capacitance, providing a control unit adapted to control the controllable switch for precharging the output capacitance at a startup of the converter arrangement, adapting the control unit to control the controllable switch during startup such that a duty cycle of the controllable switch during at least one half period of the input voltage is between 0 and 1, providing power to the control unit at least during the startup of the converter arrangement by an auxiliary power supply included in the converter arrangement, and connecting the auxiliary power supply to an auxiliary power input for connecting an external power source.

19. Converter arrangement including an input stage comprising:

two input terminals for connecting an AC input voltage, a converter stage for converting the AC input voltage to a DC output voltage and an output stage comprising an output capacitance, where the DC output voltage is provided across the output capacitance, the converter arrangement further including a controllable switch arranged in a current path from one of the two input terminals to the other and including said output capacitance, and a control unit adapted to control the controllable switch for precharging the output capacitance at a startup of the converter arrangement, the control unit further being adapted to control the controllable switch during startup such that a duty cycle of the controllable switch during at least one half period of the input voltage is between 0 and 1, wherein the converter arrangement includes an auxiliary power supply for providing power to the control unit at least during the startup of the converter arrangement, and wherein the converter arrangement is adapted to provide power to the control unit after the startup of the converter arrangement.

20. Method for providing a converter arrangement for converting an AC input voltage to a DC output voltage, including the steps of:

providing an input stage comprising two input terminals for connecting an AC input voltage, a converter stage for converting said AC input voltage to said DC output voltage and an output stage comprising an output capacitance, connecting said converter stage to said output stage for providing the DC output voltage across the output capacitance, arranging a controllable switch in a current path from one of the two input terminals to the other and including said output capacitance, providing a control unit adapted to control the controllable switch for precharging the output capacitance at a startup of the converter arrangement, adapting the control unit to control the controllable switch during startup such that a duty cycle of the controllable switch during at least one half period of the input voltage is between 0 and 1, providing power to the control unit at least during the startup of the converter arrangement by an auxiliary power supply included in the converter arrangement, and providing power to the control unit after the startup of the converter arrangement by the converter arrangement.

* * * * *